United States Patent
Kirchner et al.

(10) Patent No.: US 10,338,970 B2
(45) Date of Patent: Jul. 2, 2019

(54) MULTI-PLATFORM SCHEDULER FOR PERMANENT AND TRANSIENT APPLICATIONS

(71) Applicant: INTERNATIONAL BUSINESS MACHINES CORPORATION, Armonk, NY (US)

(72) Inventors: Peter D. Kirchner, Putnam Valley, NY (US); Krzysztof P. Onak, Scarsdale, NY (US); Robert Saccone, Glen Head, NY (US); Kanthi Sarpatwar, Mohegan Lake, NY (US); Joel L. Wolf, Goldens Bridge, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 277 days.

(21) Appl. No.: 15/270,975

(22) Filed: Sep. 20, 2016

(65) Prior Publication Data
US 2018/0081722 A1    Mar. 22, 2018

(51) Int. Cl.
*G06F 9/50* (2006.01)
*G06F 9/48* (2006.01)

(52) U.S. Cl.
CPC .......... *G06F 9/505* (2013.01); *G06F 9/4881* (2013.01); *G06F 9/5005* (2013.01); *G06F 9/5083* (2013.01); *G06F 9/5088* (2013.01)

(58) Field of Classification Search
CPC ...... G06F 9/505; G06F 9/4881; G06F 9/5083; G06F 9/5088; G06F 9/5005; G06F 11/3433; G06F 2206/1012
See application file for complete search history.

(56) References Cited

U.S. PATENT DOCUMENTS

| | | | |
|---|---|---|---|
| 2010/0131959 A1* | 5/2010 | Spiers | G06F 9/50 718/105 |
| 2012/0023498 A1 | 1/2012 | Sundararaman et al. | |
| 2012/0180068 A1 | 7/2012 | Wein et al. | |
| 2012/0304191 A1* | 11/2012 | Morgan | G06F 9/5088 718/105 |
| 2013/0227571 A1 | 8/2013 | Jayamohan | |

(Continued)

FOREIGN PATENT DOCUMENTS

| | | |
|---|---|---|
| WO | 01/082075 A2 | 11/2001 |
| WO | 01/082075 A3 | 11/2001 |
| WO | 2012028213 | 3/2012 |

OTHER PUBLICATIONS

Ramakrishna, S. et al., "ABSA: An Agent-Based Tool for System Administration", 2003, IEEE, pp. 312-318.

*Primary Examiner* — Jacob D Dascomb
(74) *Attorney, Agent, or Firm* — F. Chau & Associates, LLC

(57) ABSTRACT

A method of scheduling assignment of resources to a plurality of applications includes: determining shares of the resources assigned to each application during a first period; determining shares of the resources assigned to each application during a second period that occurs after the first period; determining an imbalance value for each application that is based on a sum of the shares assigned to the corresponding application over both periods; and considering requests of the applications for resources in an order that depends on a result of comparing the imbalance values of the applications.

18 Claims, 8 Drawing Sheets

(56) References Cited

U.S. PATENT DOCUMENTS

2014/0075024 A1\* 3/2014 Koza .................. H04L 63/104
                                                                                                 709/225
2015/0178116 A1  6/2015 Jorgensen et al.
2017/0093923 A1\* 3/2017 Duan .................. H04L 63/1408

\* cited by examiner

Algorithm 1

Input: family of lines $L_d = \{l_1, ..., l_n\}$, input points $C$, potential container points set $\mathscr{F}$ on $L_d$ and a budget $k$ 1: for all profile tuples $\Pi$ (w.r.t. $L_d$) and integers $k' \leq k$ do
2:   if $k' = 0$ then
3:     if $\Pi = ((0^d), ..., (0^d))$ then
4:       $\mathscr{M}(\Pi, k') = 0$
5:     else
6:       $\mathscr{M}(\Pi, k') = \infty$
7:     end if
8:   else
9:     $c_m$ be the container point with maximum $\ell_1$-norm in $\Pi$
10:     for all $c'_m \prec c_m$ such that both $c_m$ and $c'_m$ lie on the same line $l_m$ do
11:       $n(c'_m) \leftarrow |\text{feas}(\Pi) \setminus \text{feas}(\text{chld}(\Pi, c'_m))|$
12:       $f(c'_m) \leftarrow (\mathscr{M}(\text{chld}(\Pi, c'_m), k' - 1) + n(c'_m)\|c_m\|)$
13:     end for
14:     $\mathscr{M}(\Pi, k') \leftarrow \underset{c'_m}{\text{Min}} f(c'_m)$
15:   end if
16: end for
17: return profile p with least cost $\mathscr{M}(\Pi, k)$ such that $C = \text{feas}(\Pi)$.

FIG. 7

MULTI-PLATFORM SCHEDULER FOR PERMANENT AND TRANSIENT APPLICATIONS

STATEMENT REGARDING FEDERALLY SPONSORED RESEARCH OR DEVELOPMENT

This invention was made with Government support under Contract No. H98230-14-D-0038 awarded under by the Department of Defense. The Government has certain rights to this invention.

BACKGROUND

1. Technical Field

The present disclosure relates generally to scheduling of permanent and transient applications, and more particularly to such scheduling using a fairness algorithm.

2. Discussion of Related Art

In computing, a virtual machine is an emulation of a particular computer system. Virtual machines (VMs) operate based on the computer architecture and functions of a real or hypothetical computer. VMs rely on a hypervisor, which is normally installed atop the actual bare metal system hardware. Once the hypervisor layer is installed, VM instances can be provisioned from the system's available computing resources. Each VM can receive its own unique operating system and workload (e.g., one or more applications to execute).

Containers are arranged differently from VMs. With containers, a host operating (OS) system is installed on the system first, and then a container layer is installed atop the host OS. Once the container layer is installed, container instances can be provisioned from the system's available computing resources and applications can be deployed within the containers. Each container instance shares the same underlying host OS. Containers are regarded as more resource efficient than VMs.

In computing, scheduling is the method by which work is assigned to resources that complete the work. For example, a scheduler may assign work to one or more VMs or one or more Containers. However, in a multi-platform system, it can be difficult to make these assignments efficient.

BRIEF SUMMARY

According to an exemplary embodiment of the inventive concept, a method of scheduling assignment of resources to a plurality of applications includes: determining shares of the resources assigned to each application during a first period; determining shares of the resources assigned to each application during a second period that occurs after the first period; determining an imbalance value for each application that is based on a sum of the shares assigned to the corresponding application over both periods; and considering requests of the applications for resources in an order that depends on a result of comparing the imbalance values of the applications.

According to an exemplary embodiment of the inventive concept, a computer system is configured to schedule assignment of resources to a plurality of applications. The system includes a memory storing a computer program and a processor configured to execute the computer program. The computer program is configured to determine shares of the resources assigned to each application during a first period, determine shares of the resources assigned to each application during a second period that occurs after the first period, determining an imbalance value for each application that is based on a sum of the shares assigned to the corresponding application over both periods, and consider requests of the applications for resources in an order that depends on a result of comparing the imbalance values of the applications.

According to an exemplary embodiment of the inventive concept, a computer program product includes a computer readable storage medium having program instructions embodied therewith. The program instructions are executable by a computer to perform a method including: determining shares of the resources assigned to each application during a first period, determining shares of the resources assigned to each application during a second period that occurs after the first period, determining an imbalance value for each application that is based on a sum of the shares assigned to the corresponding application over both periods, and considering requests of the applications for resources in an order that depends on a result of comparing the imbalance values of the applications.

BRIEF DESCRIPTION OF THE SEVERAL VIEWS OF THE DRAWINGS

Exemplary embodiments of the invention can be understood in more detail from the following descriptions taken in conjunction with the accompanying drawings in which:

FIG. 7 illustrates a program/algorithm that may be used in embodiments of the invention.

DETAILED DESCRIPTION

Figure 1:
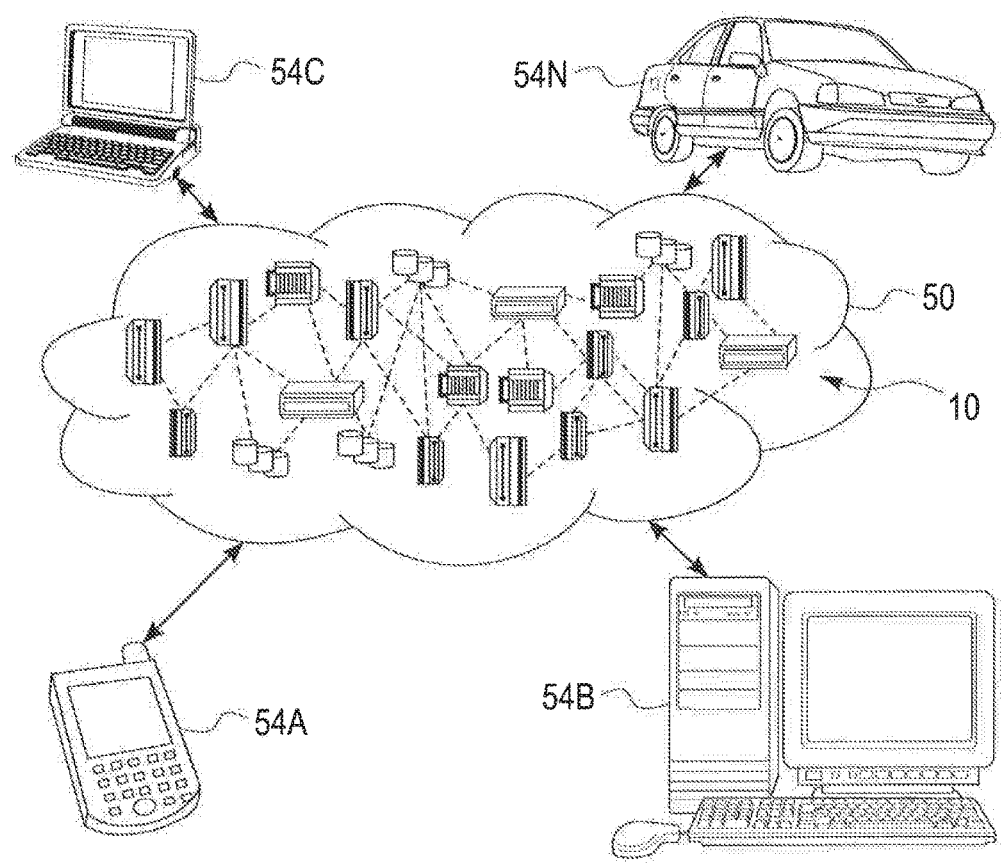
FIG. 1 illustrates a cloud computing environment according to an embodiment of the present invention.

The inventive concept will be described in more detail with reference to the accompanying drawings, where exemplary embodiments of the present disclosure have been illustrated. Throughout the drawings, same or like reference numerals are used to represent the same or like components. However, the present inventive concept can be implemented in various manners, and thus should not be construed to be limited to the embodiments disclosed herein. On the contrary, those embodiments are provided for the thorough and complete understanding of the present disclosure to convey the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Examples are the orchestration of a manufacturing process, a process to retrieve or store goods in a wholesale or retail store, a process to analyze a medical sample or set of samples, a process governing a series of chemical reactions, a process to analyze and file incoming paper documents in a financial institution, a process to manufacture a chemical substance, a process to monitor an automobile engine, a process to monitor a chemical reaction, or a process to monitor a medical device.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes. Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
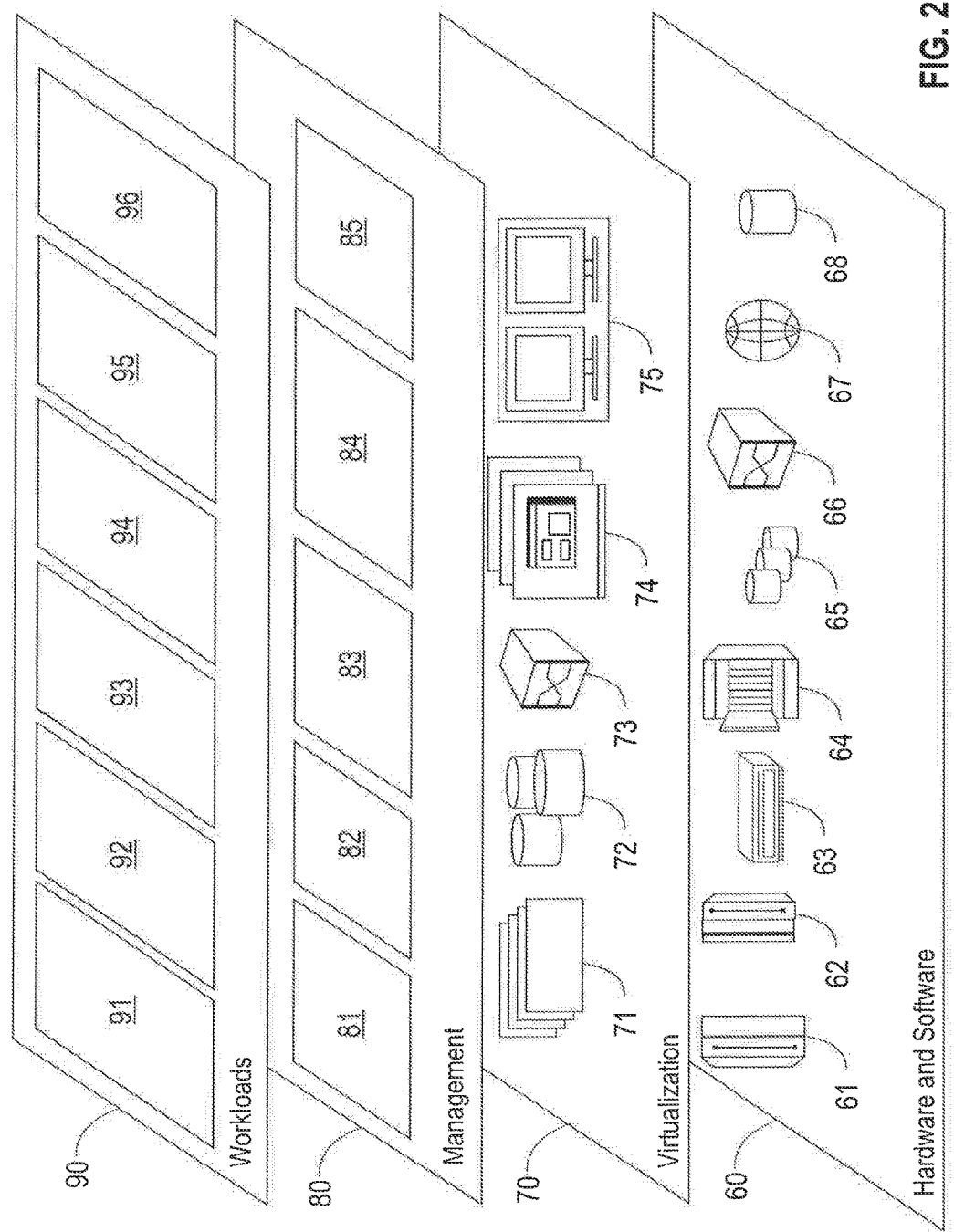
FIG. 2 depicts abstraction model layers according to an embodiment of the present invention, which may be used to implement a scheduler.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a scheduling manager 96. The scheduling manager 96 will be discussed in more detail below.

Figure 3:
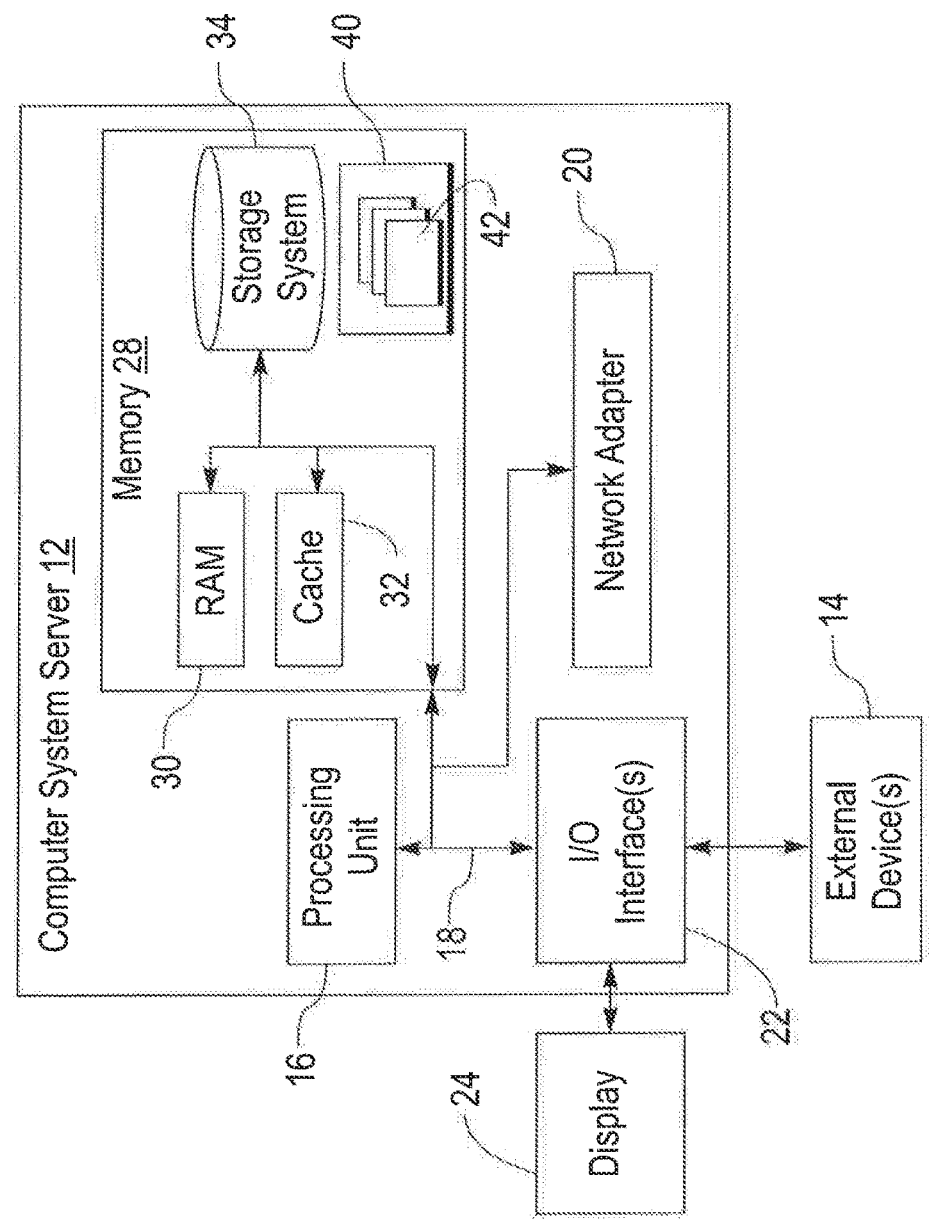
FIG. 3 shows an exemplary computer system which may be used to implement the scheduler.

FIG. 3 illustrates an embodiment of a computer server that may be used to implement part of computing devices 54A-54N, or the scheduling manager 96, which is applicable to implementing embodiments of the present invention. Computer system/server 12 is only illustrative and is not intended to suggest any limitation as to the scope of use or functionality of embodiments of the invention described herein.

As shown in FIG. 3, the computer system/server 12 is shown in the form of a general-purpose computing device. The components of the computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

The computer system/server 12 may include a variety of computer system readable media. Such media may be any available media that is accessible by the computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/non-volatile computer system storage media. By way of example, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

A program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. The computer system/server 12 can communicate with one or more networks such as a local area network (LAN), a general wide area network (WAN), and/or a public network (e.g., the Internet) via a network adapter 20. As depicted, the network adapter 20 communicates with the other components of computer system/server 12 via the bus 18. It should be understood that although not shown, other hardware and/or software components could be used in conjunction with the computer system/server 12. Examples of these other hardware and/or software components include, but are not limited to: microcode, device drivers, redundant processing units, external disk drive arrays, RAID systems, tape drives, and data archival storage systems.

Figure 4:
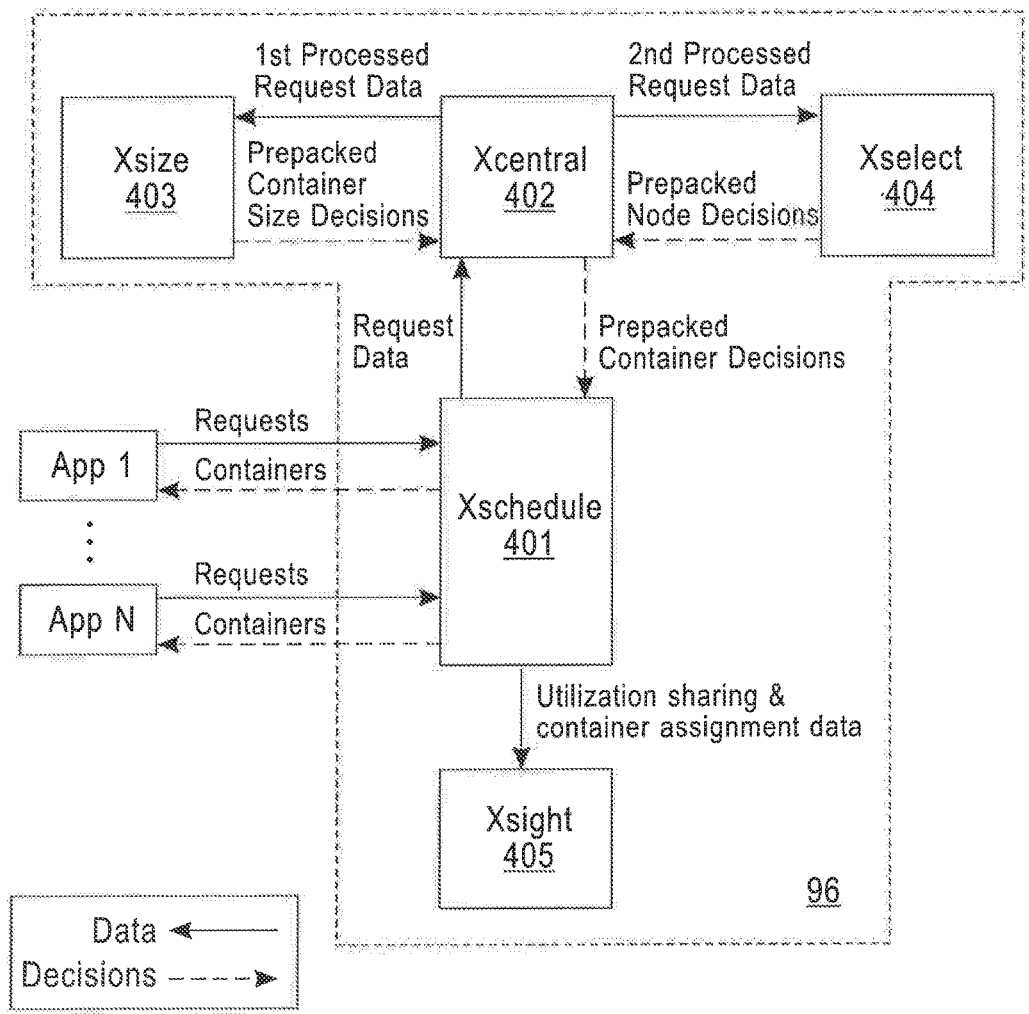
FIG. 4 illustrates a system according to an exemplary embodiment of the inventive concept.

FIG. 4 illustrates an architecture of the scheduling manager 96 according to an exemplary embodiment of the inventive concept. A scheduling unit 401 (e.g., Xschedule) of the scheduler responds to container requests from various applications. The scheduling unit 401 grants some of the container requests and may preempt some containers. The scheduling unit 96 is configured run periodically (e.g., every 250 ms). In an exemplary embodiment, the scheduling manager 96 is a plug-in to a resource manager such as APACHE HADOOP YARN. The resource manager has a scheduler and an applications manager. The scheduler performs its scheduling function based on requirements of the application. For example, the scheduler may perform its scheduling function based on the abstract notion of a resource Container, which incorporates resources such as a certain amount of memory, CPUs, disk space, and network bandwidth.

The scheduling manager 96 pre-packs a subset of its processing nodes offline provided (a) the containers that are vector packed for those nodes are used in a sufficiently continual manner, and (b) the vector packing algorithm produces a sufficiently high quality solution (e.g. well packed with little resources wasted.

The scheduling manager 96 may additionally include a visualization engine 405 (e.g., Xsight) that provides dynamic visualizations of recent states via a variety of views.

The scheduling unit 401 is supported by two offline optimization components, namely a sizing unit 403 (e.g., Xsize) and a selection unit 404 (e.g., Xselect). The sizing unit 403 determines a fixed number K of pre-packed container sizes. Each container size may identify a certain combination of resources and amounts of those resources. For example, a small container size could identify 2 CPUs and 8 GB of memory, whereas a large container size could identify 40 CPUs and 160 GB of memory. A container request needs to be able to fit within one of the available container sizes that has been determined by the sizing unit 403. For example, a container request for 1 CPU and 4 GB of memory would likely receive a container of the small container size, whereas a container request for 35 CPUs and 130 GB of memory would likely receive a container of the large container size. The goal is to select K container sizes so that the aggregate resource usage (when each task is assigned its "smallest" dominating container) is minimized. The sizing unit 403 is configured to run periodically (e.g., every month, quarter, etc.), but less frequently than the scheduling unit 401. The input to the sizing unit 403 and the output from the sizing unit 403 is handled by a servicing unit 402. The servicing unit 402 provides outputs of the sizing unit 403 to the selection unit 404.

The selection unit 404 is configured to run periodically (e.g., every week) more often that the sizing unit 403, but less often than the scheduling unit 401. The selection unit 404 uses an output of the sizing unit 403 (e.g., available container sizes) as well as application data provided by the scheduling unit 401 (e.g., container requests) to attempt a vector packing of some of the processing nodes to generate a set of high quality vector packed nodes. For example, a vector packing of a processing node is the assignment of a set of containers related to the container request to the processing node. However, the set could be empty if this high quality cannot be achieved.

The servicing unit 402 receives request data from the scheduling unit 401 that describes the container request. The servicing unit 402 processes the request data to generate first processed request data and provides it to the sizing unit 403. The servicing unit 401 processes the request data in a different manner to generate second processed request data and provides it to the selection unit 404. The servicing unit 402 receives pre-packed container sizes from the sizing unit 403, which operates on the first processed request data. The sizes are also passed to the selection unit 404. The servicing unit 402 receives from the selection unit 404 pre-packed node decision information and passes this information on to be implemented and used by the scheduling unit 401. The pre-packed node decision information may indicate may identify a processing node, containers the processing node is to be packed with, the application associated with the containers, and the sizes of those containers.

The scheduling unit 401 implements an online scheduling algorithm according to an exemplary embodiment of the invention. The scheduling unit 401 receives and grants resource allocation requests from applications and tracks the resource utilization of each application over time. When sufficient resources are not available to meet demand, the scheduling unit 401 may reclaim resources (by preemption) from applications that have exceeded their fair share. The scheduling unit 401 determines precisely where a container for a granted request should be placed. This may be on one of the nodes with pre-packed containers (e.g., the pre-packed nodes are computed by the selection unit 404) and passed onto the scheduling unit 401 via the servicing unit 402). Otherwise a best bit is found on one of the other nodes, using an online vector-packing algorithm. The scheduling unit 401 may periodically send resource utilization information and other metrics to the visualization unit 405.

The scheduling unit 401 divides applications into two categories, permanent and transient. A permanent application may be those applications that are automatically started when a computer server (e.g., a processing node) is started or booted. A permanent application may continue to run until a system command is executed that terminates the permanent application. For example, when a server is started, it may run a startup script that starts all of the permanent applications such as an email server and a database. The permanent applications typically run until the system is powered down. A transient application is an application that is run intermittently. For example, a user may startup a transient application to perform a word processing task and use the application for an hour before shutting it down. The scheduling unit 401 may manage an editable table that lists all of the applications and identifies whether they are considered permanent or transient. Both types of applications have an assigned application priority and a sharing bound. In an exemplary embodiment, a permanent application is also assigned a bonus share, which is an additional resource quota that is accrued during each scheduling interval. This effectively allows a permanent application to have a pre-assigned minimum share of a given cluster (e.g., a group of processing nodes or servers). The scheduling unit 401 may maintain default values for each of these values.

The applications call the scheduling unit 401 to queue resource requests, release containers that are no longer being used, and to receive notifications of resource grants and pending container preemptions. The applications may perform these calls during a periodic heartbeat interval in a single call to the Resource Manager where the scheduling unit 401 is running. Resource requests describe the size (e.g., memory, number of CPU cores, storage, and/or network bandwidth), rack or host level placement constraints, node blacklist constraints and number of containers. Each request contains a request priority and an optional preemption priority. The request priority helps determine the order in which requests from the application are serviced. The preemption priority helps determine the order to be considered when the scheduling unit 401 is determining a preemption target.

In an embodiment, the scheduling unit 401 allows each application to specify a request type. The request types are PrepackedOnly, PrepackedFirst, and NonPrepackedOnly. An application with a resource request whose request type is PrepackedOnly indicates to the scheduling unit 401 that it should choose a pre-packed container from one of those that have been assigned to it by the selection unit 404. An application with a resource request whose request type is PrepackedFirst indicates to the scheduling unit 401 that it should allow online allocations if an acceptable prepacked allocation cannot be found. An application with a resource request whose request type is NonPrepackedOnly indicates to the scheduling unit 401 that it should only consider online containers.

The scheduling unit 401 is an epoch-based scheduler. It runs in a configurable periodic interval. The amount of time in the current epoch length (currEpoch) is monitored. The scheduling unit 401 maintains for each application, two variables to keep track of the long-term actual share of the cluster as well as a current fair share. The scheduling unit 401 uses these to compute a long-term application imbalance for each application. The relative application imbalances then drive the scheduler decision in a greedy fashion. The two long-term variables are passed and updated from epoch to epoch, so that there are both lastShare and newShare variables, and lastImbalance and newImbalance variables. For example, the newShare of epoch 1 becomes the lastShare of epoch 2 and the newImbalance of epoch 1 becomes the lastImbalance of epoch 2. In an exemplary embodiment, a new application imbalance (e.g., newImbalance) is calculated according to the following Equation 1.

$$\text{newImbalance} = (\text{lastImbalance} + \text{currEpoch}) \times (\text{newShare} - (\text{fairShare} + \text{bonusFairShare})) \qquad (1).$$

The equation is reevaluated for each application throughout the epoch every time there are changes to newShare.

Figure 5:
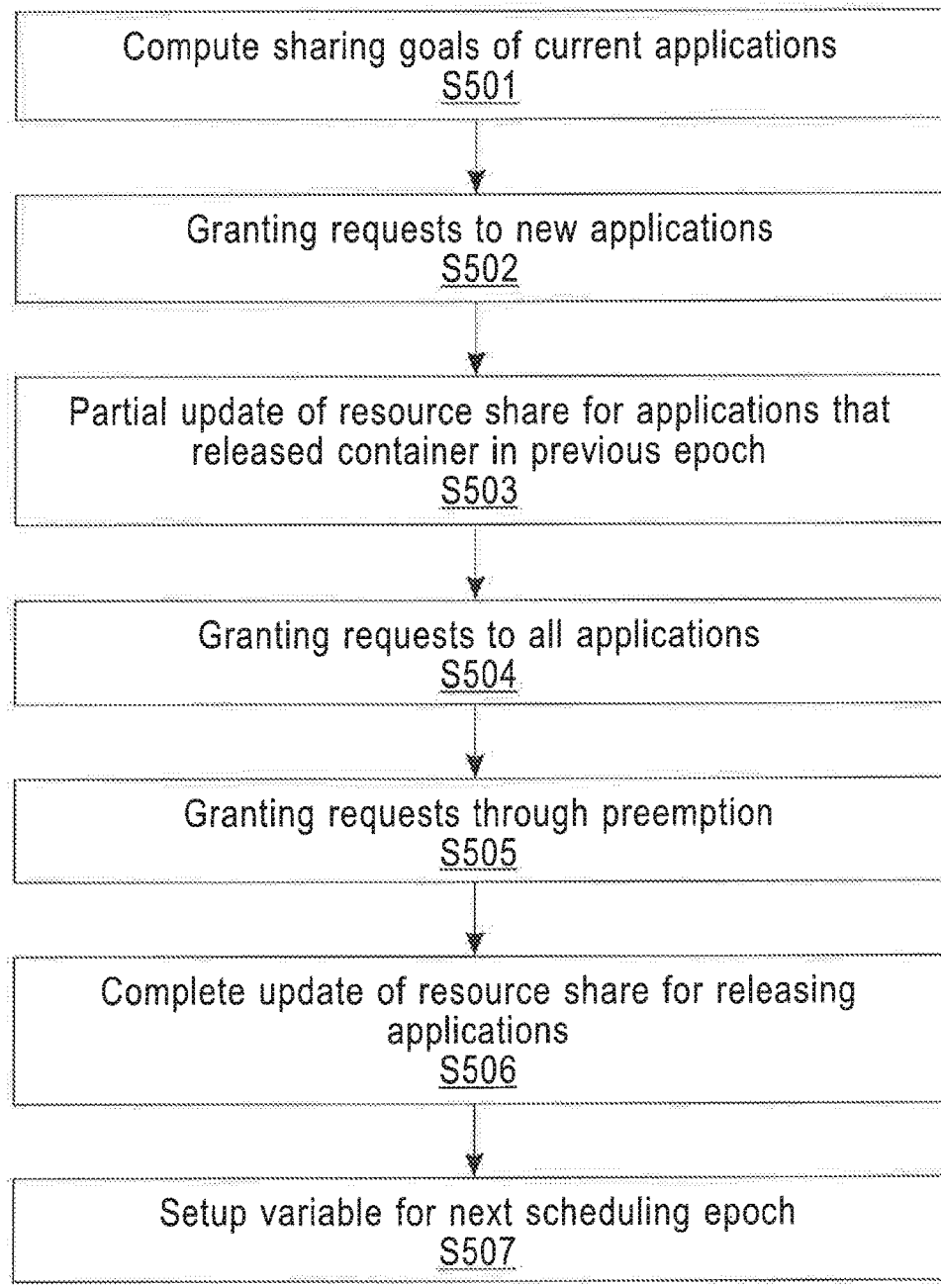
FIG. 5 illustrates a scheduling algorithm according to an exemplary embodiment of the inventive concept.

FIG. 5 illustrates a scheduling method according to an exemplary embodiment of the inventive concept. Referring to FIG. 5, the method includes: re-computing sharing goals of all the current applications, if necessary (S501), granting requests to new applications (S502), bookkeeping for existing applications which have released containers in the previous epoch (S503), granting requests to all the applications (S504), granting requests through preemption (S505), bookkeeping for existing applications which have released containers in the previous epoch (S506), and preparing for the next scheduling epoch (S507). These steps will be explained in more detail below.

The sharing goal of an application computed in phase S501 can be computed by calculating a fairShare of the application and adding this fairShare to a bonusFairShare associated with the application. If the application is permanent, its bonusFairShare may have a non-zero value and if the application is transient, its bonusFairShare is 0. As discussed above, when an application makes a request for resources, it includes a request priority in the request. The request of an application may be submitted by an Application Master (AM) container of the application. The request priorities are all inverted and normalized with respect to each other to generate a fairShare for each application. For example, if application1 made a first request for resources with a request priority of 2 and application2 made a second request for resources with a request priority of 4, then the fairShare for application1 is ½ (e.g., 0.5) and the fairshare for application 2 is ¼ (e.g., 0.25). If application1 is a transient application and application2 is a permanent application with a bonusFairShare of 0.5 (0.5), then the sharing goal of application1 is 0.5 and the sharing goal of application 2 is 0.75.

The granting of requests to new applications performed in phase S502 requires the calculation of a newImbalance for each application. New applications have initial lastImbalance and newShare values of 0, so Equation 1 yields a negative value of newImbalance. This means they are poor, and deserve to be granted resources. For example, if we assume the first currEpoch is 0.25 (e.g., 250 ms), application3 is a new transient application, and the request priority of application 3 is 2, then the newImbalance of application3 is $(0+0.25) \times (0-(\frac{1}{2}+0)) = -0.125$. Further, if we assume application4 is a transient application, and the request priority of application4 is 4, then the newImbalance of application4 is $(0+0.25) \times (0-(\frac{1}{4}+0)) = -0.0625$. A list is then created for all the new applications, ordered by their newImbalance values, from smallest (most negative) to largest (least negative). The scheduling unit 401 then traverses the list, attempting to the extent possible to grant pending requests based on this order. As the scheduling unit 401 visits each new application on the list, the scheduling unit 401 considers its pending resource request(s) in priority order, trying to find available space on the cluster. If the scheduling unit 401 cannot fill any request for the first application on the list of new applications, it proceeds to the next application on the list. In this example, the scheduling unit 401 would attempt to grant the request of application3 first because its newImbalance value is lower than that of application4.

If the scheduling unit 401 is able to fill the request of an application on the list of new applications, the scheduling unit 401 updates its newShare variable. In an embodiment, the newShare variable is updated based on a sum of the normalized container dimensions in each dimension. For example, if 0 to 100 cores is normalized from to 0 though 1 and 0 GB to 100 GB is normalized to 0 to 1, and the request of application3 was granted with a container having 50 CPU cores (normalized to 0.5) and 25 GB of memory (normalized to 0.25), then the sum would be 0.75. Then the newShare of application 3 is incremented from 0 to 0.75. Next Equation 1 for the new application for which the newShare is calculated is recalculated. If the newImbalance value becomes positive, the application is removed from the list of new application. If not, its position in the list is updated and the process is repeated. For example, the newImbalance for application3 would then be recalculated to $(0+0.25) \times (0.75-(\frac{1}{2}+0)) = +0.0625$, and since it is positive, it would be removed from the list. The scheduling unit 401 repeats these steps until it fails for every new application or the list of new applications becomes empty. In an embodiment, each new application can make multiple requests for resources (e.g. a container).

In phase S503, the scheduling unit 401 performs a bookkeeping for the existing applications which have released containers in the previous epoch. The scheduling unit 401 keeps track of each container that has been released during the previous scheduling epoch. It is assumed that the release time is halfway through the previous interval. In this phase, newShare for each released container of an application is decremented by containerSize/2 of the container. For example, if an existing application had been assigned a newShare of 0.5 due to a container size of 25 CPU cores and 25 GB, and it released the container in the previous epoch, its newShare would be decremented to 0.25. Then, Equation 1 is re-evaluated for this existing application to update its newImbalance value.

In phase S504, the scheduling unit 401 forms a list of all applications, ordered by their newImbalance values. Values on this list may be positive or negative. The scheduling unit 401 traverses the list of all applications, attempting again to grant pending requests based on this order (e.g., poorest to richest, i.e., most negative to most positive). Pending resource requests are considered in priority order, subject to available space. In the case of a failure, the next application on the list is considered. In the case of a success, newShare for that application is incremented and Equation 1 is recalculated for this application, as before. Then its position in the list of all applications is updated, and the process is repeated. The scheduling unit 401 repeats these steps until it fails for every application or the list or requests becomes empty. The applications are not removed from the list of all applications, even if their newImbalance turns positive.

In phase S505, certain applications may be preempted, assuming they participate in preemption. However, certain applications cannot be preempted. The scheduling unit 401 may maintain a table that indicates whether or not each application can be preempted. For the applications that can be preempted, the scheduling unit 401 basically adopts a "Robin Hood" approach. It takes from the rich and gives to the poor. The poor applications are those for which newImbalance≤−SharingBound. The SharingBound may be a pre-defined value or specified by each application in the configuration of the system. The SharingBound of an application is the degree to which the application is willing to shares its resources with another application allows. An administrator of the system may specify a sharing bound on a per application basis. If one is not specified, the application can inherit a default value specified by the administrator.

The scheduling unit 401 creates a list of all the poor applications, ordered from poorest to least poor. Similarly, the rich applications are those for which newImbalance≥+SharingBound. The scheduling unit 401 creates a separate list of all the rich applications, ordered from richest to least rich. In an embodiment, the scheduling unit 401 employs a greedy scheduling scheme that uses a doubly nested loop. The outer loop is based on the poor applications and the inner loop is based on the rich applications. Pending resource requests for the poor applications are considered in request priority order, and potential target containers from the rich applications are considered in reverse preemption priority order. Failures proceed according to the order imposed by the doubly nested loop. If a satisfactory preemption is found, the value of newShare for the preempting application is incremented, and the value of newShare for the preempted application is correspondingly decremented. Then Equation 1 is re-evaluated for each.

The preempting application is removed from its list (e.g., the poor list) if its newImbalance exceeds its −sharingBound. The preempted application will be removed from its list (e.g., the rich list) if its newImbalance falls below its +sharingBound. The remaining applications are repositioned within their list. The process continues until either no preemptions can be found in a full pass through the two loops or one or both lists become empty.

The actual preemption process involves adding the target container to a container preemption list for the application, which receives this list on its next heartbeat call. A countdown timer whose duration comes from a configuration of the scheduling unit 401 is started. If the timer expires before the preempted application voluntarily releases the target container, the scheduling unit 401 will forcible terminate the target container assigned to the application to be preempted and reclaim the resources (e.g., CPU cores, memory, etc.) associated with the target container. In an embodiment, these timeout checks occur at the very first step in the scheduling interval. Once the resource manager notifies the scheduling unit 401 that the target container has stopped executing, the scheduling unit 401 will set up a new container for the preempting application. The preempting application may be notified of the new allocation the next time it makes a heartbeat call.

In phase S506, the other half of the process started in phase S503 is completed. For example, the newShare for each application that released a container during the previous epoch is decremented by another containerSize/2 and the Equation 1 is re-evaluated. For example, if an existing application's newShare had been decremented to 0.25 in phase S503 due to a container size of 25 CPU cores and 25 GB (e.g., 0.25+0.25) due to it releasing the container in the previous epoch, its newShare would be decremented to 0. While the above method shows the newShare of an existing application that has released a container in a previous epoch being decremented by containerSize/2 twice during different phases of the method, the inventive concept is not limited thereto. For example, the newShare can instead be decremented all at once by the full containerSize at one point of time within the method.

In phase S507, the scheduling unit 401 sets lastImbalance for each application to the last computed newImbalance for the application. Further, in this phase, the scheduling unit 401 sets a variable lastShare for each application to the last computed newShare for the application, so that the entire process can be repeated during the next scheduling epoch. The variable lastShare is set at the end of a current epoch. Thus, the lastShare is stored into newShare before the newImbalance is calculated for a next epoch. After newShare has been set to lastShare, newShare may be further modified to reflect resources that were released by the application during the previous epoch.

Next, a process is used by the scheduling unit 401 to find the specific container location to which a successful resource request will be assigned. The process involves a sequence of search stages through a list of candidate alternatives. The candidate alternatives may correspond to the available locations in which the request container can be placed to fulfill the request. Locations that do not have enough space are not considered. In an embodiment, locations that can accommodate the container size are weighed against additional criteria specified in the request, and a score is computed for each of these locations. The location with the highest score wins. The process includes ordering the search stages, filtering the searches, and scoring the list of remaining potential 'winners'. Specifically, for each stage in the search sequence, the scheduling unit 401 filters out unacceptable container locations and scores each of the acceptable container locations. If the list of acceptable locations is non-empty, the scheduling unit 401 chooses the location with the highest score. If the list of acceptable locations is empty, the scheduling unit 401 proceeds to the second stage of the search sequence. A success at any stage ends the process, and an assignment is made. A failure at the final stage in the search indicates that no appropriate container can be found.

Non-preemptible applications are assigned a fixed partition of the cluster, which may include pre-packed containers. A non-preemptible application may not make a container assignment from outside its partition.

The ordering for a Non-preemptive case is described next. The output of the selection unit 404 includes nominal owners for each of the pre-packed containers. For example, if a first application requested a container, and an offline component of the system pre-packed a first container for the first application, then the nominal owner of the first container would be the first application.

For PrePackedOnly non-preemptible applications, the first search stage is a search through all pre-packed containers assigned to that application. The second search stage is a search through all pre-packed containers assigned to the other applications, which are preemptible. For PrePackedFirst non-preemptible applications, the first search stage is a search through all pre-packed containers assigned to that application.

The second search stage is over all processing nodes, which have not been vector packed by the selection unit 404. A non-preemptible application has specified PrePackFirst in its resource request. First, all the pre-packed container assignments for that application are checked to see if they can fulfill the request. If one can of the pre-packed container assignments can fulfill the request, then it is used and the process ends. Otherwise, the search moves on to check all the non-prepacked areas of all the processing nodes to determine if there is one that can fulfill the request. If one or more is found the one with highest score wins. If nothing is found in the non-prepacked areas of the nodes, the search moves on to consider prepacked containers of other preemptible application during a third search stage.

The third search stage includes all pre-packed containers assigned to other preemptible applications. For NonPrepackedOnly non-preemptible applications, there is only one search stage over all processing nodes, which have not been vector packed by the selection unit 404. In the case where an application is non-preemptible or a preemptible application specifies NonPrepackedOnly in its request, then the scheduling unit 401 will perform only a single search over all the processing nodes that have resources which have not been vector packed by the selection unit 404.

The filtering for a Non-preemptive case is described next. Any potential pre-packed container must be free and the request needs to fit. For example, the request should be no greater in dimension (e.g., number of CPUs and an amount of memory of the request) than the dimension (e.g., number of CPUs and amount of memory of the container) of the pre-packed container. A pre-packed container not meeting this constraint is filtered out. Similarly, there needs to be sufficient free space on a non-prepacked processing node to fit the container request. All other alternatives are filtered out. Hard node or rack constraints may be used to filter out certain alternatives. A hard node or rack constraint is where the requestor has specified that the container must be located on a specific node or rack. Blacklisted processing nodes are also filtered out. For example, certain processing nodes may be designated as being unavailable during certain periods of time. The scheduling unit 401 can also filter out pre-packed containers whose size (e.g., referred to as a candidateSize) is too much greater than the size (e.g., containerSize) of the container request. A threshold value may be designated to perform this filtering. In an embodiment, if the containerSize/candidateSize≥a threshold T, then the candidate container is filtered out. For example, if T is 50%, and the containerSize of the request is more than twice the candidateSize of the candidate pre-packed container, the candidate pre-packed container is too large and will be filtered out.

The scoring for a Non-preemptive case is described next. Once acceptable locations have been found, the winner is the one with the highest score. In an embodiment, the score is a weighted sum of certain items. In an embodiment, the weights are included within a configuration file of the scheduling unit 401. For pre-packed containers, one summand of the score is containerSize/candidateSize. For non-pre-packed processing nodes, a cosine similarity value is a summand of the score. If both the container request and the available free space on a node are viewed as vectors, the cosine similarity is the angle between the amount of memory of the container request and the amount of available free space. A smaller angle is preferred because it implies a similarity of the two vectors. If there are soft node constraints, candidate containers on that node are given a unit summand, and the same applies to soft rack constraints. A soft node or rack constraint is a preference for that node, but the requestor will take any container placement. A winning pre-packed container for the application is placed on an in-use list and also on the list of new container grants for that application. The list of new container grants is returned to the application when the application called into the resource manager on its heartbeat. The bookkeeping for a winning non-pre-packed container is similar. The instantaneous charge for a pre-packed container is based on the dimensions of that container rather than the dimensions of the application request.

A preemptive case is described next. The scheduling unit 401 is aware of the identity of both the original application and the potential preempted application. The scheduling unit 401 does not select the application master of the victim application for preemption. In the preemptive case, the potential "winners" are all in-use containers. Beyond this, the major difference between the preemptive and non-preemptive cases is that in the former there is an outer ordering based on the preemption priority of the preemptible container. The inner ordering is similar to the non-preemptive case. If the potential preemptive container does not fit, it is filtered out. Further, the potential preemptive container with invalid hard node or rack constraints, which is on a blacklisted node, or too large will be filtered out. The scoring is based on the size ratio and the various soft constraints.

The visualization unit 405 may provide graphical views of the state of the cluster over time. Each graph may be access via a web browser. The data used in drawing the graphs is provided by the scheduling unit 401. On a periodic basis, the scheduling unit 401 assembles all the data needed to draw the graphs, and posts them to a webserver running a webserver component of the visualization unit 404. The time interval used to publish the visualized data can be customized in a configuration file of the visualization unit 405. The visualization unit 405 can show the relative sharing imbalance between any application and the rest of the applications running on the cluster, show the total amount of resources that each application has been granted over time, and show the nodes in the cluster and their current container assignments.

The primary input to the sizing unit 403 is a profile of the various resource requests made by the applications using the cluster, weighted by frequency. The number K of container shapes allowed is also input. The output of the sizing unit 403 is a set of K different container dimensions so that every request "fits" into at least one container, optimized to minimize the total resources used when assigning these requests to their best fitting containers. The resource usage of a request is therefore the sum of the normalized dimensions of the container to which it is assigned.

The value K is configurable. The resource request input is generated by the scheduling unit 401, and the scheduling unit 401 sends the resource request to the servicing unit 402. In an embodiment, this data is then compressed periodically (e.g., at multiple time granularities) by the servicing unit 402. The servicing unit 402 generates frequencies of various container sizes from the data and outputs these frequencies to the sizing unit 403. After the sizing unit 403 performs its optimizations, the output is fed via the servicing unit 402 to the selection unit 404. In an embodiment, the sizing unit 403 uses a polynomial time algorithm (PTAS), whose performance is within $1+\in$ of optimal. Assume initially that there are two dimensions, say cores and memory. The loss of an $\in$ factor comes from considering only solutions on one of $\lceil \pi/\in \rceil+1$ equi-angled rays in the first quadrant emanating from the origin. For solutions to problems on these rays, the scheme, which is a dynamic program (see Algorithm 1 of FIG. 7) based on K, provides an exact solution. So we transform the original problem to one where container points must be chosen from these rays. This scheme is then repeated for various decreasing values of $\in$ until a predetermined amount of execution time has elapsed or a sufficiently precise solution has been achieved.

We use the following notation: [n] means $\{1, \ldots, n\}$. And $(x,y) \prec (u,v)$ means that $x \le u$ and $y \le v$. In this case we say that $(u,v)$ dominates $(x,y)$. Formally, the sizing problem for the sizing unit is as follows. Given n points $(x_i, y_i)$ and frequency weights $w_i$ for $i \in [n]$, find K container points $C=\{(u_j,v_j): \text{for } j[K]\}$ such that the following cost(C) Equation is minimized:

$$\sum_{i \in [n]} \left( \min_{j:(x_i,y_i) \prec (u_j,v_j)} w_i(u_j + v_j) \right). \quad (2)$$

If $X=\{x_i : i \in [n]\}$ and $Y=\{y_i : i \in [n]\}$, then any optimal solution satisfies $OPT \subseteq X \times Y$.

A transformation of the potential container points $X \times Y$ is next described. An $\in$ is fixed and $\theta$ is chosen such that $\theta \ge [\in/2]$ and $\pi/2e$ is an integer. Then lines are defined to $l_m \equiv y \cos(m-1)\theta - x \sin(m-1)\theta = 0$, for $m=1, \ldots, \pi/2\theta+1$. A transformation of a point is defined as $p_i=(x_i, y_i) \in X \times Y$. If $(x_i, y_i) \in l_m$ for some m, then $p_i^T=p_i$. Otherwise, $p_i$ is contained in the area bounded by the lines $l_m$ and $l_{m+1}$, for some $m \ge \pi/2\theta$. Points $p_i^x=(x_i+\Delta x, y_i)$ and $p_i^y=(x_i, y_i+\Delta y)$ are defined such that $p_i^x$ is on line $l_m$ and $p_i^y$ is on $l_{m+1}$. The transformed point can be defined by the Equation 3 as follows:

$$p_i^T = \begin{cases} p_i^x, & \text{if } \Delta x \le \Delta y \\ p_i^y & \text{Otherwise.} \end{cases} \quad (3)$$

Figure 6:
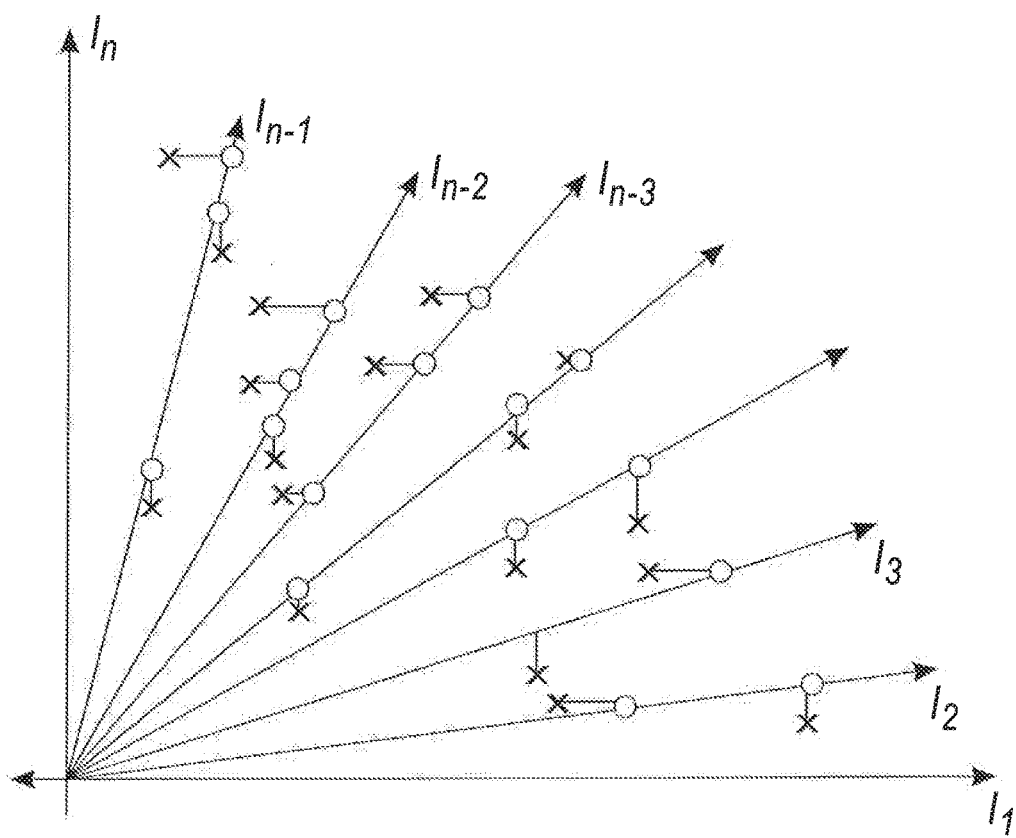
FIG. 6 illustrates a transformation that is described with respect to a part of the system.

FIG. 6 illustrates this transformation. Under this transformation, the optimal solution is preserved within an approximation factor of $(1+\in)$. To be precise, $OPT=(o_1, \ldots, o_k)$ is assumed to be an optimal solution of the original instance and $OPT^T=(o_1^T, \ldots, o_k^T)$ is assumed to be the set of points obtained by applying the above transformation to OPT. Then $OPT^T$ is a feasible solution for the original instance and $cost(OPT^T) \le (1+\in)OPT$.

Thus, it can be assumed that all the container points are chosen from a constant $c=\pi/2\theta+1$ number of lines. On each line, there are a polynomial number of candidate points which have ordinates from $\{y_1, \ldots, y_n\}$ or abscissa from the set $\{x_1, \ldots, x_n\}$. The variable N is assumed to be the number of candidate points on these c lines. Lines are denoted as $l_1, \ldots, l_c$ which pass through the center and are ordered in an anti-clockwise direction. A set of potential container points is denoted by C. A profile P is defined as $(p_1, \ldots, p_c)$, where the point $p_i \in C$ is on line $l_i$. The feasible region of a profile P, denoted by F(P), is the set $\cup_{(xi,yi) \in P} \{(u,v): u \le x_i \ \& \ v \le y_i\}$ of those points in the profile tuple. The number of distinct profiles is at most $N^C$.

The dynamic program variable C(P,K) is then defined as the cost of K optimal points (from Equation 2, but set to $\infty$ if not feasible) chosen from $F(P) \cap C$ such that i) every point in P tuple is chosen, ii) every chosen point is from $F(P)) \cap C$, where on any line $l_i$ with the profile point $p_i$, $p_i$ is the highest cost chosen point, and iii) all points in F(P) are dominated since every point in P is chosen.

Further, a child profile of P is defined that is denoted P[p,p'] as the profile by replacing the point $p \in P$ by a container point p' on the same line as p, such that $p' \prec p$. $Lp'=|F(P) \backslash F(P[p,p'])|$ is assumed to be the number of input points in the feasible region of P but not in the feasible region of P[p']. If $p_m(x_m, y_m)=\arg \max (x_i+y_i)$ is assumed then $C(P,K)=_{p'}^{min}(C(P[p_m,p'], K-1)+Lp' \cdot (x_m+y_m))$.

The resulting solution can be further improved by "pushing back" the chosen container points so long as their feasible regions are unaffected. K is a somewhat soft variable in the sizing unit 403, more of a goal than a hard number. The overall solution quality is known with respect to the wasted space in these containers. If one is not satisfied with that waste, the nature of the dynamic program allows one to continue solving for slightly higher values of K. For higher dimensions, the scheme proceeds inductively, starting with d=2. The initial step involves a family $L_2$ of rays in two dimensions, as above. In the inductive step, one starts with the family $L_{d-1}$ and observes that each of these rays will induce a 2-dimensional plane in d-dimensions. This 2-dimensional construction is used to produce $L_d$. The process is stopped when the actual number of dimensions is reached.

In an embodiment, the selection unit 404 computes a high quality vector packing of a subset of containers, which can be expected to be in nearly continual use to a subset of the processing nodes. The containers it packs are of sizes produced by the sizing unit. The servicing unit 402 identifies the set of reliably used containers by processing data received from the scheduling unit 401.

On a configurable periodic basis (e.g., every minute) the scheduling unit 401 sends the servicing unit 402 a list of all active containers and their applications. Those containers are then replaced by their best fitting containers from the sizing unit. The data may be compressed and processed periodically (at multiple hierarchical intervals). Thus the servicing unit knows the cardinality and the distribution of applications for each such container sized by the sizing unit during that interval. The cardinalities then are collected to form a histogram for the full set of intervals in a fixed window of time (configurable). If a fixed threshold F (configurable) close to 1 is considered, for any given container type sized by the sizing unit, the servicing unit can then compute the largest number N for which the fraction of intervals which exceed or equal N is at least F. The fraction may be a monotonically non-increasing function of N, which can be found in logarithmic time. The number N is the number of containers of that type that the selection unit will attempt to vector pack well.

In an embodiment, the selection unit 404 obtains a description of the available nodes. During a first step, the selection unit computes the total amount of resources required in each dimension. It then uses linear programming to find a subset of available nodes by type which provide sufficient resources in each of those dimensions. Since the solution to the linear program can be fractional, the selected number of nodes of each kind used is initially rounded up to the nearest integer. This may result in assigning more nodes of a particular type than exist in the cluster. To address this, the selection unit greedily removes nodes in a second step. In the second step, the selection unit uses a few simple greedy heuristics to generate candidate vector packings of the chosen containers into the set of nodes selected in the first step. Two main heuristic algorithms may be used for the packing.

In a First Fit algorithm, the selection unit 404 sorts the nodes from largest to smallest. Next, for each container, in order of largest to smallest size, the selection unit assigns it to the first node in which it fits. If none exist the container is not packed.

In a Largest into Emptiest algorithm, the selection unit 404 also sorts the containers from largest to smallest. Out of all nodes in which a given container will fit, the selection unit 404 chooses the one with the largest amount of available space. If none exist the container is not packed.

The container size, node size, and amount of available space are multidimensional vectors, each dimension corresponding to one resource type. In order to apply the above heuristic schemes, the selection unit has to compare those multidimensional vectors and select the largest container, the node with the largest amount of available space, and so on. Three options for mapping a vector into a real number may be considered, which are then used for comparison: additive size (the sum of all coordinates, the l1 norm of the vector), multiplicative size (the product of all coordinates), and the sum of the squares of all coordinates (the l2 norm of the vector).

In an embodiment, in a third step, the selection unit 404 attempts to improve on each of the packings created in the prior step. As long as it is possible, the selection unit moves a small number of containers between nodes in order to insert a container that has not yet been assigned. Any improvement is accepted. The complexity grows rapidly with the number of containers being moved. In order to speed up the search process, in an exemplary embodiment, the selection unit 404 maintains a data structure that for every small set of containers inserted and/or removed that provides the list of nodes for which this kind of operation can be applied. The selection unit 404 may run for a fixed amount of time and then output its best solution. In an embodiment, any processing nodes which are not packed acceptably well according to some configurable threshold Q are discarded. The number of remaining containers that are sized by the sizing unit 403 and packed in this fashion are then apportioned fairly among the various applications, according to the distributions computed by the servicing unit. Thus the containers are assigned owners.

Figure 8:
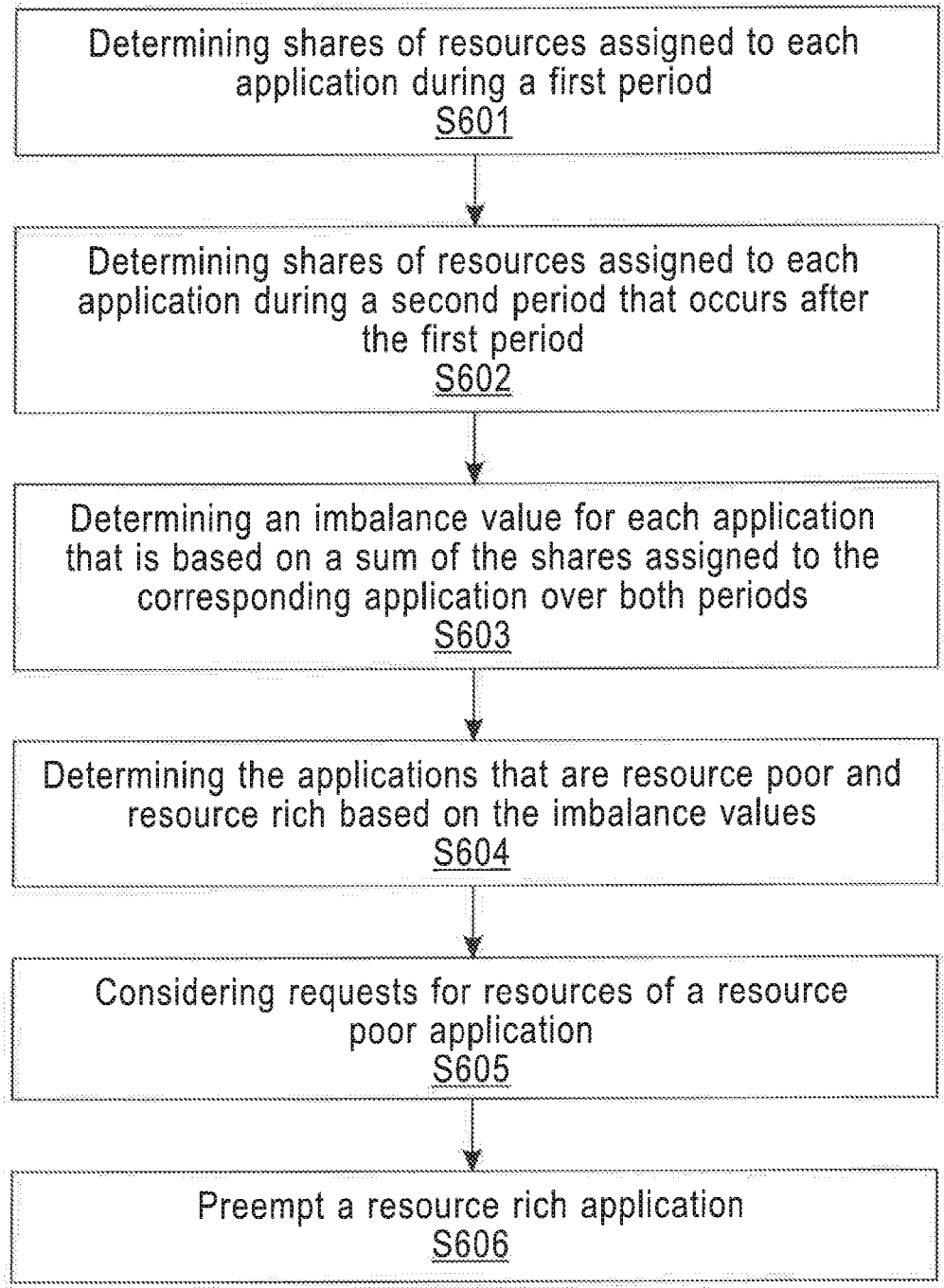
FIG. 8 illustrates a scheduling algorithm according to an exemplary embodiment of the inventive concept.

FIG. 8 illustrates a scheduling algorithm according to an exemplary embodiment of the invention. The algorithm includes: determining shares of resources assigned to each application during a first period (S601), determining shares of the resources assigned to each application during a second period that occurs after the second period (S602), and determining an imbalance value for each application that is based on a sum of the shares assigned to the corresponding application over both periods (S603). For example, if a first application was assigned 2 CPUs and 2 GB during period 1 and 8 CPUs and 8 GB during period 2, its total resource share could be considered (2+2+8+8) 20, and if a second application was assigned 14 CPUs and 14 GB during period 1 and 6 CPUs and 6 GB during period 2, its total resource share could be considered (14+14+6+6) 40. The imbalance values of applications in this embodiment are equivalent to their total resource share. The method further includes determining the applications that are resource poor and resource rich based on the imbalance values (S604). If it is assumed that applications with imbalance values less than 30 are resource poor and other they are resource rich, then the first application would be considered resource poor and the second application would be considered resource rich. The method next includes considering the requests for resources of a resource poor application (S605). For example, if the resource imbalance value of the first application is 20 and the resource imbalance value of a third application is 22, then the resource requests of the first application would be considered before the resource requests of the third application. If the request of the first application cannot be satisfied then the system can next try to satisfy the requests of the third application. The method further includes preempting a resource rich application (S606). For example, since the second application is considered resource rich, it may be preempted to free up resources so they can be assigned to the first application. If there are enough resources to grant to the first application without preempting the second application, then the second application need not be preempted.

An application master may release a container when it no longer needs the resources of the container. For example, a user may have requested execution of a transient application, and an application master may have been granted a container to run the transient application. However, once the user exits the transient application, rather than the application master releasing the container, in an exemplary embodiment, the application master retains the container for a period of time to perform some additional jobs, and performs a $2^{nd}$-level scheduling algorithm on these jobs. The $2^{nd}$-level scheduling algorithm uses dynamic shortest processing time (DSPT) scheduling. A new queue is added to the Application Master to accommodate this scheduling. As an example, the Application Master may be the YARN SPARK Application Master. The goal of the algorithm is to optimize average response time. The algorithm may be optimal for a single processor, but is still excellent for parallel scheduling environments such as those that exist in a cluster. In an embodiment, a separate queue is used for each job managed by the Application Master. The queue is interposed between the admission of new jobs and the submission tasks. The number of remaining tasks in the job can be used as a simple approximation of the remaining processing time. Upon arrival of a job, a new queue is created for the tasks in the new job. The application master counts available executors with a semaphore. The semaphore may be a variable that is used for controlling access, by multiple applications, to a common resource in a concurrent system. In an embodiment, the application master is a multi-threaded application including execution threads for executing the tasks of a job and a submission thread. The execution threads wait on the semaphore an upon exiting the wait, the submission thread draws the next task from the then-shortest queue (the DSPT). The submission thread briefly sits in a separate queue, which is configured by an embodiment of the invention to use first come first served (FCFS) to dispatch the tasks to executors.

The response time of the scheduling performed by the scheduling manager 96 when the application master uses the $2^{nd}$-level scheduling algorithm is better than Dynamic Resource Fairness (DRF) and FCFS scheduling. In certain implementations, the response time of an embodiment of the invention is 9%-37% better than a DRF scheduler. In other implementations, the response time of an embodiment of the invention is 22%-42% better than a FCFS scheduler. Thus, the scheduling manager 96 can provide a dramatic improvement to the functioning of a computer system or a cluster of computer systems.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of scheduling assignment of computer resources to a plurality of applications, the method comprising:
   determining, by a processor, shares of the computer resources assigned to each application during a first period;
   determining, by the processor, shares of the computer resources assigned to each application during a second period that occurs after the first period;

determining, by the processor, an imbalance value for each application that is based on a sum of the shares assigned to the corresponding application over both periods;

determining, by the processor, a first set of the imbalance values that are below a range; and assigning a first container to a first application among the applications associated with the lowest imbalance value of the first set to satisfy a first request of the first application for computer resources when the first container is available with enough computer resources to satisfy the first request.

2. The method of claim 1, further comprising:

assigning a second container to a second application among the applications associated with the next lowest imbalance value of the first set to satisfy a second request of the second application for computer resources when the first container is not available and the second container is available with enough computer resources to satisfy the second request.

3. The method of claim 1, further comprising:

determining, by the processor, a second set of the imbalance values that are above the range;

determining, by the processor, the highest imbalance value of the second set; and preempting, by the processor, the application associated with the highest imbalance value.

4. The method of claim 3, further comprising the processor assigning computer resources of the preempted application to the first application when the first request is satisfied.

5. The method of claim 1, wherein determining the imbalance value for the first application comprises:

subtracting a sharing goal of the first application from the share of the first application during the second period; and adding the share of the computer resources of the first application during the first period to the result of the subtracting to generate the imbalance value of the first application.

6. The method of claim 5, wherein the subtracting comprises:

determining a priority of the first request of the first application;

inverting the priority to generate an inverted value; and generating the sharing goal based on the inverted value.

7. The method of claim 6, wherein generating the sharing goal comprises:

setting the sharing goal to a sum of the inverted value and a pre-defined non-zero value when the first application is a permanent application; and setting the sharing goal to the inverted value when the first application is a transient application.

8. The method of claim 7, wherein the permanent application is resident on a computer server, the permanent application is started when the computer server is booted, and the transient application is run only when started by a user.

9. The method of claim 1, wherein the first request is for a container including at least two different types of computer resources.

10. The method of claim 9, wherein the first request identifies a certain number of central processing units and a certain amount of memory.

11. A computer system configured to schedule assignment of computer resources to a plurality of applications, the system comprising:

a memory storing a computer program; and a processor configured to execute the computer program, wherein the computer program is configured to determine shares of the computer resources assigned to each application during a first period, determine shares of the resources assigned to each application during a second period that occurs after the first period, determine an imbalance value for each application that is based on a sum of the shares assigned to the corresponding application over both periods, and determine a first set of the imbalance values that are below a range and assign a first container to a first application among the applications associated with the lowest imbalance value of the first set to satisfy a first request of the first application for computer resources when the first container is available with enough computer resources to satisfy the first request.

12. The computer system of claim 11, wherein the computer program determines a second set of the imbalance values that are above the range, determines the highest imbalance value of the second set, and preempts the application associated with the highest imbalance value.

13. The computer system of claim 12, wherein the computer program assigns computer resources of the preempted application to the first application when the first request is satisfied.

14. The computer system of claim 11, wherein the computer program assigns a second container to a second application among the application associated with the next lowest imbalance value of the first set to satisfy a second request of the second application for computer resources when the first container is not available and the second container is available with enough computer resources to satisfy the second request.

15. A computer program product to schedule assignment of computer resources to a plurality of applications, the computer program product comprising a computer readable storage medium having program instructions embodied therewith, the program instructions executable by a computer to perform a method comprising:

determining shares of the computer resources assigned to each application during a first period;

determining shares of the computer resources assigned to each application during a second period that occurs after the first period;

determining an imbalance value for each application that is based on a sum of the shares assigned to the corresponding application over both periods;

considering requests of the applications for computer resources in an order that depends on a result of comparing the imbalance values of the applications; and assigning a first container to a first application among the first applications associated with the lowest imbalance value of the first set to satisfy a first request of the first application for computer resources when the first container is available with enough computer resources to satisfy the first request.

16. The computer program product of claim 15, the method further comprising assigning a second container to a second application among the applications associated with the next lowest imbalance value of the first set to satisfy a second request of the second application for computer resources when the first container is not available and the second container is available with enough computer resources to satisfy the second request.

17. The computer program product of claim 15, the method further comprising determining a second set of the imbalance values that are above the range;

determining the highest imbalance value of the second set; and preempting the application associated with the highest imbalance value.

18. The computer program product of claim 17, the method further comprising assigning computer resources of the preempted application to the first application when the first request is satisfied.

* * * * *